(12) United States Patent
Sahinoglu et al.

(10) Patent No.: US 8,933,673 B2
(45) Date of Patent: Jan. 13, 2015

(54) METHOD AND SYSTEM FOR CHARGING BATTERIES USING A KINETIC MODEL

(75) Inventors: Zafer Sahinoglu, Cambridge, MA (US); Xusheng Sun, Atlanta, GA (US); Koon Hoo Teo, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 360 days.

(21) Appl. No.: 13/418,593

(22) Filed: Mar. 13, 2012

(65) Prior Publication Data

US 2013/0241467 A1 Sep. 19, 2013

(51) Int. Cl.
*H02J 7/00* (2006.01)

(52) U.S. Cl.
USPC .......................... 320/157; 320/162

(58) Field of Classification Search
CPC ........................................ H02J 7/045
USPC .................. 320/155–157, 160–162
See application file for complete search history.

(56) References Cited

U.S. PATENT DOCUMENTS

| 7,009,401 | B2 * | 3/2006 | Kinoshita et al. ............. 324/430 |
| 7,896,477 | B2 * | 3/2011 | Sugahara ........................ 347/68 |
| 8,552,693 | B2 * | 10/2013 | Paryani .......................... 320/152 |
| 8,643,342 | B2 * | 2/2014 | Mehta et al. ................... 320/160 |
| 2011/0012563 | A1 * | 1/2011 | Paryani et al. ................ 320/162 |

OTHER PUBLICATIONS

J. Manwell and J. McGowan, E. Baring-Gould, and A. Leotta Extensions of the kinetic battery model for wind/hybrid power systems, in Proc. European. Wind Energy Assoc. Conf. (EWEC), 1994, pp. 284-289.

D. Rakhmatov and S. Vrudhula, "An analytical high-level battery model for use in energy management of portable electronic systems," in Proc. Int. Conf. Computer aided Design, 2001, pp. 488-493.

M. R. Jongerden and B. R. Haverkort, "Which battery model to use," IET Software special issue on performance engineering, vol. 3, No. 6, pp. 445-457, Nov. 2005.

* cited by examiner

*Primary Examiner* — Edward Tso
*Assistant Examiner* — Ramy Ramadan
(74) *Attorney, Agent, or Firm* — Dirk Brinkman; Gene Vinokur

(57) ABSTRACT

A battery is charged by first charging the battery at a constant current during a first time interval, and then charging the battery at a varying current during a second time interval. The battery can be a lithium-ion battery, and the charging uses a kinetic model. The kinetic model models the battery having an indiffused well having a capacity c, and a diffused well having a capacity 1−c, and the indiffused well is filled directly by the current, and the diffused well is filled only from the indiffused well via a valve with constant inductance.

13 Claims, 6 Drawing Sheets

METHOD AND SYSTEM FOR CHARGING BATTERIES USING A KINETIC MODEL

FIELD OF THE INVENTION

This invention relates generally to batteries, and more particularly to charging battery using a model.

BACKGROUND OF THE INVENTION

The use of portable electronic devices, electric vehicles, space and aircraft system, and even stationary power supplies has caused a large demand for high quality batteries. Lithium-ion batteries are frequently used because of their high energy densities and long lifetimes. Nevertheless, a long charging time continues to be a problem in applications where minimizing the charging time is important.

Constant Current-Constant Voltage

Conventional constant current-constant-voltage charging of lithium-ion batteries has two stages. First, the battery is charged at a constant current until the voltage reaches an upper limit, e.g., 4.1 or 4.2 volts. Second, the battery is charged at a constant voltage until the current reduces to about 3% of its rated value. The time required for the constant current is about one hour, and the time the constant voltage stage is about two hours for fulfill the residual 20% of the entire capacity of the battery.

Charging battery at a higher current or voltage can lead to lower battery capacity, and a shorter battery life, in addition to safety problems, e.g., overheating the battery.

Pulse Charging

Pulse charging can reduce the charging time. Pulse charging uses a high current charging, followed by a relaxation. During the high current charging, lithium ions are electro-chemically reduced and intercalated into a graphite electrode matrix. If the current density is too high, then the reduced lithium cannot be fully intercalated. This means that the reduced lithium accumulates at an interface of the battery, which limits the charging rate.

There have been many efforts on modeling the internal processes of lithium-ion batteries. Those prior art models start from different perspective but all aim for a simplistic but accurate simulation of batteries. Such models include empirical models, electrochemical models, electrical-circuit models, and stochastic models.

Another class of models is analytical. Those models also describe the nonlinear effects inside of the battery, but the models do not have such clear physical meanings as electrochemical models, or electrical-circuit models.

The conventional models simulate discharging processes.

SUMMARY OF THE INVENTION

The embodiments of the invention provide a method and system for charging a battery using a kinetic model.

Up to now, kinetic models have only been used for simulating a discharge of lithium-ion batteries.

According to the embodiments of the invention, the kinetic model is used to derive an optimal current profile for fast charging. The charging according to the kinetic model has two stages: constant current during a first time interval; and varying current during a second time interval.

The relationships between the charging according to embodiments of the invention, and conventional constant current-constant voltage, and pulse charging are also described.

DETAILED DESCRIPTION OF THE PREFERRED EMBODIMENTS

The embodiments of our invention provide a method and system for charging a battery using a kinetic model.

Two models are of interest to the invention: a kinetic model, and a diffusion model.

Kinetic Model

Figure 1A:
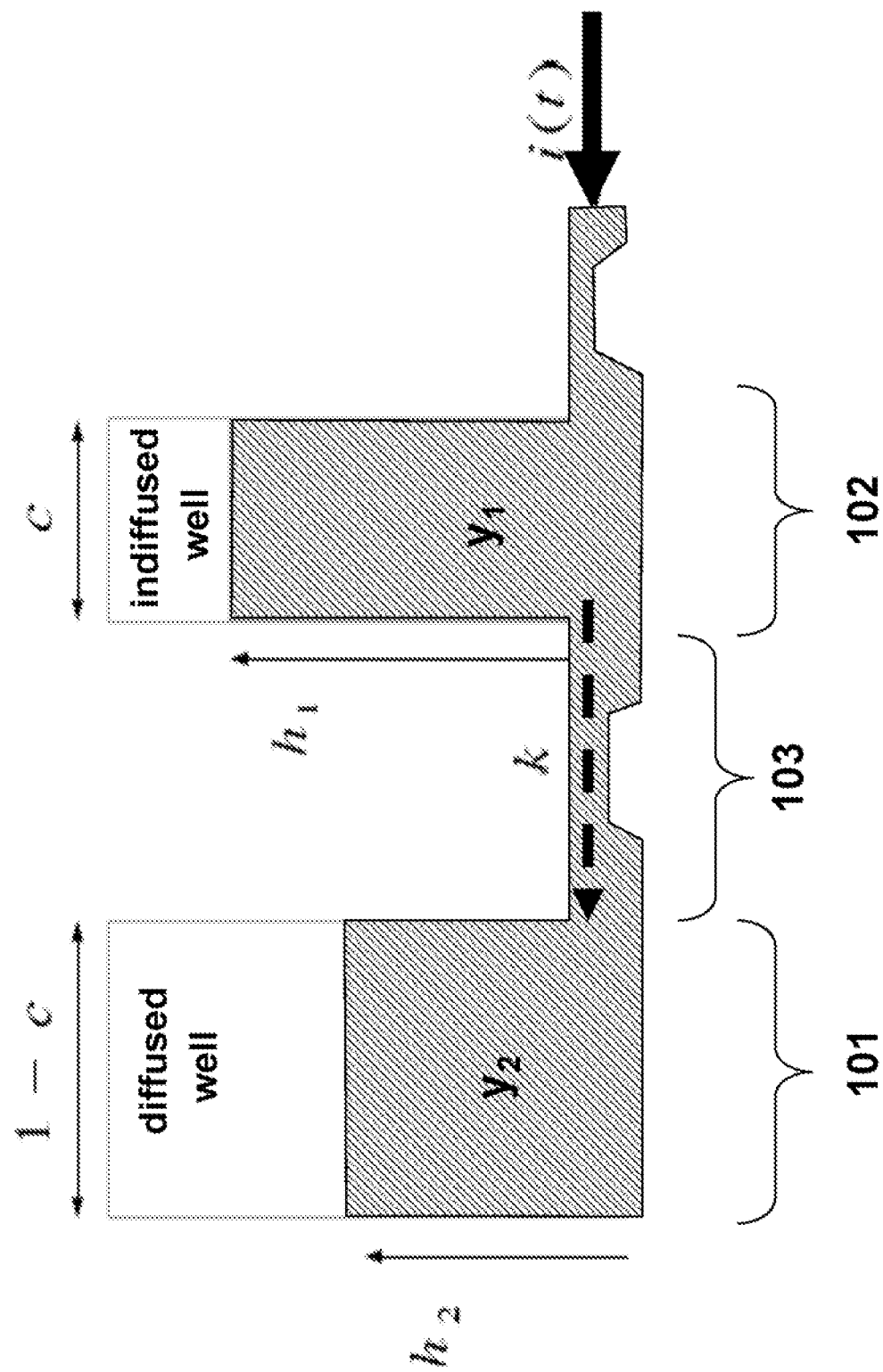
FIG. 1A is a schematic of a kinetic model for charging a battery according to embodiments of the invention.

In the kinetic model as shown in FIG. 1A the battery capacity is partitioned into a diffused well 101, and an indiffused well 102. The indiffused well is a part c of the total capacity, and the diffused well is a part 1–c of the total capacity.

The indiffused well is charged directly from a charging current i(t), while the diffused well is charged only from the indiffused well. The charge flows from the indiffused well to the diffused well through a valve 103 with constant inductance k.

The flow rate of the charge between the two wells also depends on a "height" difference between the two wells. The heights of the two wells are $h_1 = y_1/c$, and $h_2 = y_2/(1-c)$, respectively, and $y_1$ and $y_2$ represent accumulated charges the wells. In other words, the difference in the heights models the rate at which charge flows from the indiffused to the diffused well.

The battery is assumed to be substantially empty when charging starts. Hence, the change of the charge in both wells can be described by the following differential equations:

$$\frac{dy_1}{dt} = i(t) - k(h_1 - h_2) \quad (1)$$

$$\frac{dy_2}{dt} = k(h_1 - h_2)$$

with boundary conditions $y_1(0)=0$, and $y_2(0)=0$.

Diffusion Model

The diffusion model is more complicated than the kinetic model. The principle of this model is the diffusion of the ions in the electrolyte of the battery. According to this model, the processes at both electrodes are assumed to be identical so that the battery is assumed to be symmetric with respect to the electrodes and only one of the electrodes is considered.

A concentration of the electro-active species at time t and distance $x \in 2[0, \omega]$ is denoted by $C(x, t)$, where $\omega$, which is a length of the electrolyte. The evolution of the concentration is described by Fick's laws $$-J(x, t) = D \frac{\partial C(x, t)}{\partial x} \quad (2)$$

$$\frac{\partial C(x, t)}{\partial t} = D \frac{\partial^2 C(x, t)}{\partial x^2}$$

where $J(x, t)$ is the flux of the electro-active species at time t and distance x from the electrode, and D is the diffusion constant. The flux at the electrode surface is proportional to the current, while the flux on the other side of the diffusion region is zero.

A boundary conditions result in $$D\frac{\partial C(x,t)}{\partial x}\bigg|_{x=0} = \frac{i(t)}{vFA} \quad (3)$$

$$D\frac{\partial C(x,t)}{\partial x}\bigg|_{x=w} = 0$$

where A is an area of the surface of the electrode, F is Faraday's constant, and v is the number of electrons at the electrode during the electro-chemical reaction. The solution to this partial differential equation system is complicated.

It is known that the kinetic model can be treated as a very rough discretization in two steps of the diffusion model.

Therefore, the embodiment of the invention use the kinetic model for the charging process.

Fast Charging

Our fast charging has of two stages: a constant current stage during the first time interval, and a varying current stage during the second time interval.

The kinetic model for lithium-ion batteries in the charging mode is $$\frac{dy_1}{dt} = i(t) - k(h_1 - h_2) \quad (4)$$

$$\frac{dy_2}{dt} = k(h_1 - h_2)$$

with boundary conditions $y_1(0)=0$, and $y_2(0)=0$.

The battery capacity is C, and a maximum charging current is I. Then, $T=C/I$ is the time to charge.

During the constant current charging stage, we use a maximal possible charging current. During this stage, the solution for the double well system is $$a. = y_1(t) = I\left[(1-c) + ck't + (c-1)e^{-k't}\right]/k' \quad (5)$$

$$y_2(t) = I(1-c)\left(k't - 1 + e^{-k't}\right)/k'$$

At the time $t_s$, when $y_1(t_s)=cC$, the first stage completes. At the same time, $$y_2(t_s) = I(1-c)(k't_s - 1 + e^{-k't_s})/k' \quad (6)$$

We define $$\Delta = y_2(t_s)/(1-c)/C,$$

which is the filled percentage of the diffusion at the end of the first stage when the State Of Charge (SOC) is approximately $$SOC(t_s) = c + (1-c)\Delta \quad (7)$$

During the second stage, varying current charging is used, where the charging current to the indiffused well is regulated to exactly compensate for the current flow from the indiffused well to the diffused well.

The double well system degenerates into a single well system $$y_1(t) = cC \quad (8)$$

$$\frac{dy_2}{dt} = k(C - h_2)$$

The solution is $$y_2(t) = (1-c)[C - Ce^{-k''(t-t_s)}] + y_2(t_s)e^{-k''(t-t_s)} \quad (9)$$

where $k''=k/(1-c)$, which is equivalent to when the diffused well is directly charged by the charging current. In other words, i(t) is regulated as $dy_2(t)/dt$ during the second stage.

The percentage of uncharged capacities of the entire battery and the diffusion well are $\epsilon$ and $\epsilon'$, respectively, so that $$\epsilon' = \epsilon/(1-c) \quad (10)$$

The varying charging stage ends up at the time $t_f$ when $$y_2(t_f) = (1-c)(1-\epsilon')C \quad (11)$$

In this case, the diffusion well can never be strictly filled because the height of the diffusion well is always a little lower than that of the indiffused well during any finite time interval.

In term of charging current profile design, we obtain the following solution:

$$i(t) = I, 0 < t \le t_s$$

$$i(t) = [(1-c)C - y_2(t_s)]k''e^{-k''(t-t_s)}, 0 < t \le t_f \quad (12)$$

We now describe the optimality of this charging. The terminal condition of the charging process is $$h_2 = (1-\epsilon')C \quad (13)$$

We assume that the indiffused is not overfilled to avoid damage to the battery. The height of the diffusion well is a function of time. Therefore, the total charging time is $$\Gamma = \int_0^{(1-\epsilon')C} dh_2^{-1}(l) \quad (14)$$

l is the time index.

We also know that $$dh_2/dt = k'(h_1 - h_2) \quad (15)$$

Minimizing the charging time $\Gamma$ is equivalent to maximizing the ratio $h_1/h_2$. Therefore, minimizing the charging time has two stages: maximizing the constant current i(t) so that $h_1(t)$ before the indiffused well is full, and maximizing $h_2(t)$ at C after the indiffused well is full.

Method and System

Figure 1B:
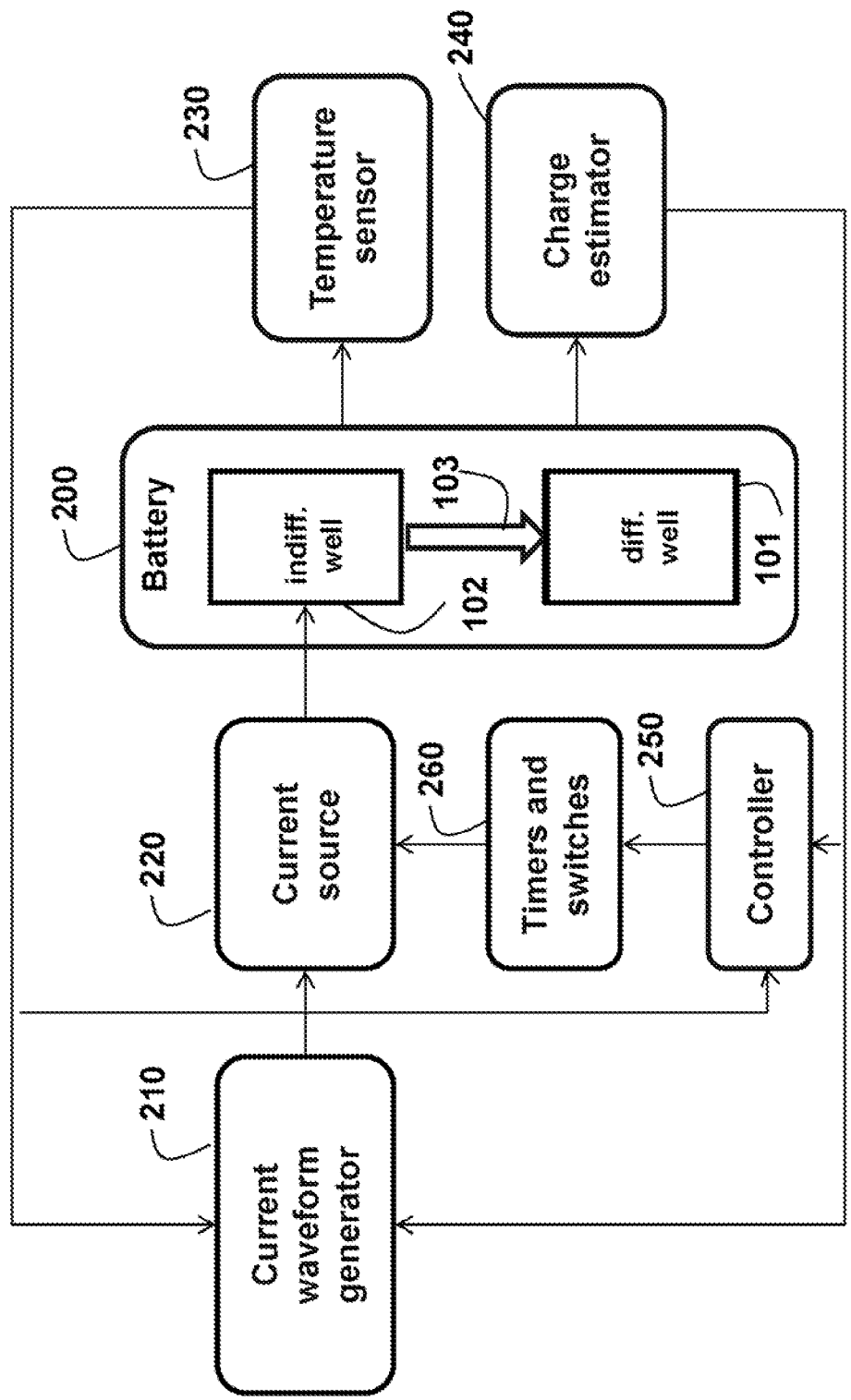
FIG. 1B is a block diagram of a system and method for charging a battery using the model of FIG. 1 according to embodiments of the invention.

FIG. 1B shows the method and system for charging a battery 200 using the kinetic model according to embodiments of the invention. According to the model the battery includes the diffusion well 201 and the indiffused well 202.

The system includes a current waveform generator 210 connected to a current source 220. The current source is connected to the indiffused well. The diffused well is charged via the valve.

A temperature sensor 230 and a charge estimator 240 provide temperature and charge state feedback, respectively, to the current waveform generator 210. A controller 250 is connected to timers and switches 260 to prevent overheating and overcharging of the battery.

Effect of the Invention

The invention uses a kinetic model to simulate charging of lithium-ion batteries. With our model, fast charging becomes possible.

The charging has two stages: a constant current charging stage during a first time interval, followed by varying current charging stage during a second time interval.

Our model has three parameters: capacity c, inductance k, and time T.

The following tables lists the overall charging time under different combinations of c and k.

TABLE I

| k | c 0.3 | 0.4 | 0.5 |
|---|---|---|---|
| 0.015 | 180 | 155 | 130 |
| 0.020 | 141 | 123 | 106 |
| 0.025 | 119 | 106 | 93 |
| 0.030 | 105 | 95 | 84 |
| 0.035 | 96 | 87 | 79 |

TABLE II

| k | c 0.3 | 0.4 | 0.5 |
|---|---|---|---|
| 0.015 | 170 | 141 | 113 |
| 0.020 | 128 | 107 | 87 |
| 0.025 | 104 | 87 | 71 |
| 0.030 | 87 | 74 | 61 |
| 0.035 | 76 | 64 | 53 |

TABLE III

| k | c 0.3 | 0.4 | 0.5 |
|---|---|---|---|
| 0.015 | 168 | 139 | 111 |
| 0.020 | 127 | 105 | 84 |
| 0.025 | 102 | 85 | 68 |
| 0.030 | 86 | 71 | 58 |
| 0.035 | 74 | 62 | 50 |

Tables I, II, and III show the charging times in the cases of T=60, T=20, and T=12. In other words, the maximum possible charging current is one, three, and five times of one hour charging current, in order.

In accordance with this realization, increasing either c or k reduces the charging time. Also, a short charging time T, or a large maximum possible charging current I equivalently decreases the charging time.

The inductance k is the most important factor. Physically, it means that the rate of diffusion is the bottleneck for the rate of charging.

Figure 2A:
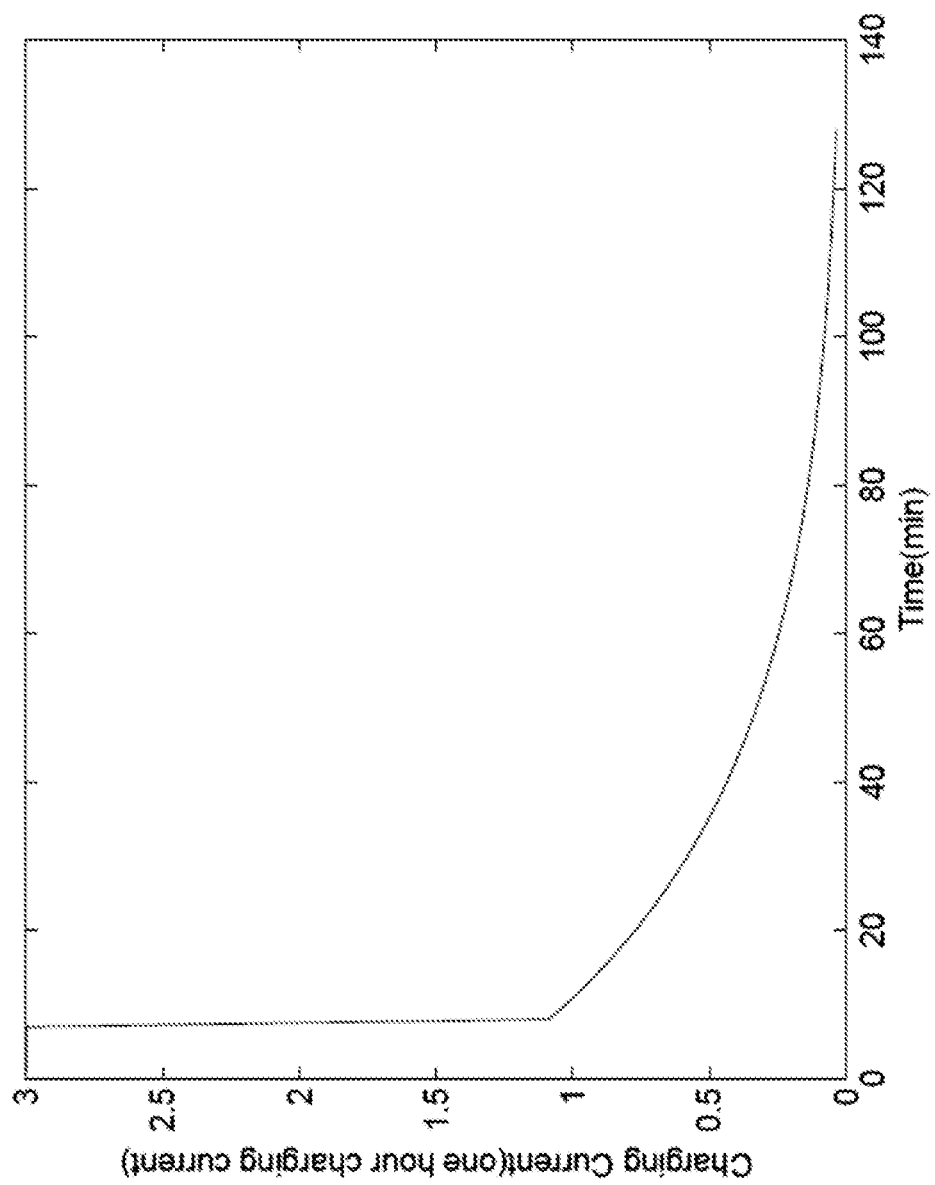
FIGS. 2A-2B are graphs of a change of charging current and charged proportion of both diffused and indiffused wells with respect to time for two different cases.
Figure 2B:
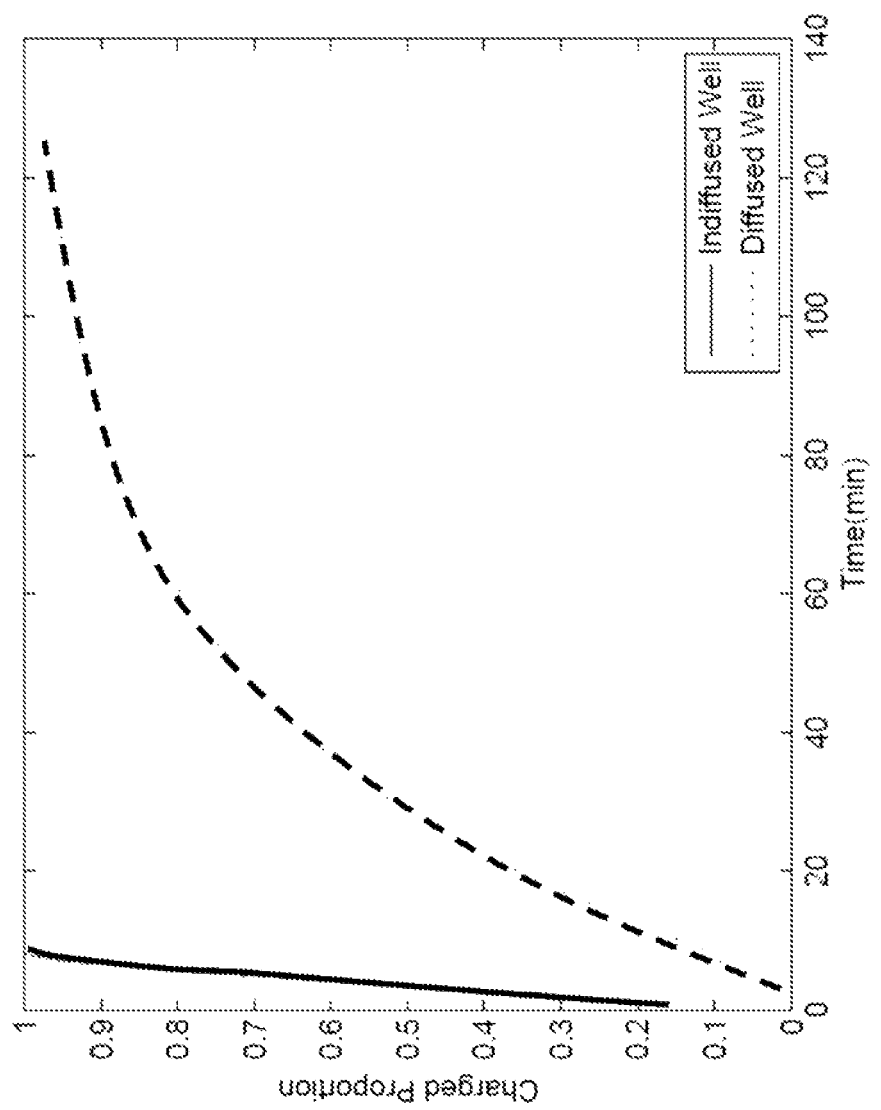

FIGS. 2A-2B show a change of charging current and charged proportion of both diffused and indiffused wells with respect to time in the case when c=0.3, k=0.020, and T=20.

Figure 3A:
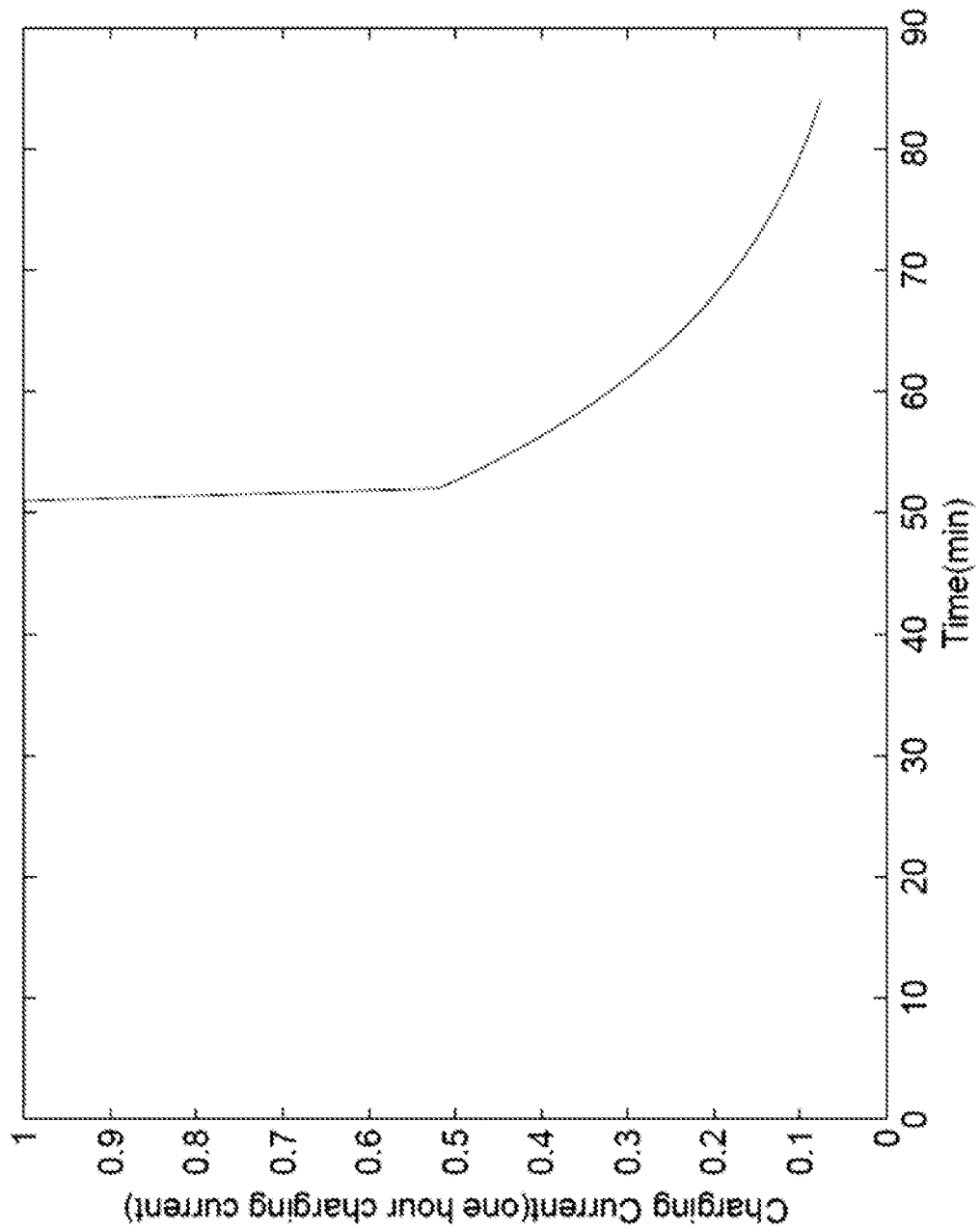
FIGS. 3A-3B are graphs of a change of a charging current and charged proportion of both diffused and indiffused wells with respect to time in the case when c=0.5, k=0.030, and T=60.
Figure 3B:
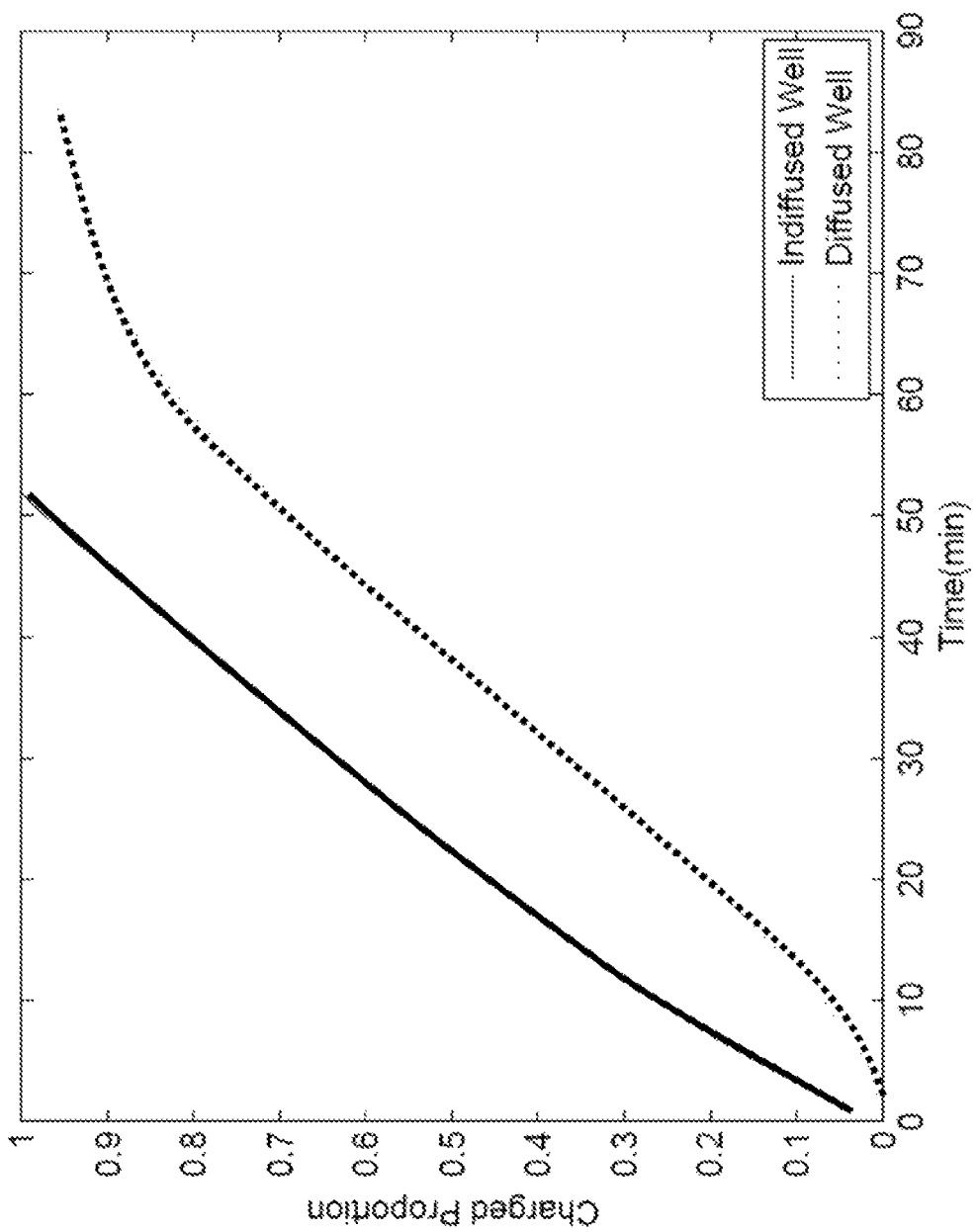

FIGS. 3A-3B shows those changes with respect to time in the case when c=0.5, k=0.030, and T=60.

It can be seen that the charging current is constant during the constant current stage, and the proportion in the indiffused well remains constant during the varying current stage.

During the varying current stage, the charging current decreases rapidly, and the proportion in the diffused well increases slowly.

Based on our kinetic model, we provide a fast charging current profile that has two stages.

It is known that there is considerable voltage decrease because of internal resistance, which suggests that the conventional constant current-constant voltage charging is suboptimal. However, that type of suboptimal charging is widely adopted mainly because it is easy to measure the voltage.

There is a relationship between our fast charging and conventional pulse charging. In essence, pulse charging is primarily based on an electrochemical model, and while our kinetic model is a very rough discretization of pulse charging.

Although our model is simplistic, it accounts for some noticeable phenomena. With respect to the pulse charging, our model is somehow equivalent to presetting an upper threshold, and a lower threshold on the fluid height in the indiffused well. However, the settings of these two threshold can also be dynamic and in real time.

The charging constant current is switched ON when the height reaches the lower threshold and is switched OFF when the height reaches the upper threshold. This is why the constant current charging time is longer than the varying current time, with the same charging amplitude, because it corresponds to a low fluid height at the beginning of the charging process, i.e., the battery is substantially empty.

Also, the higher the lower threshold, the shorter the charging time. This fast charging is the extreme case—when the lower threshold is exactly the same as the upper threshold.

Instead of using the kinetic model to for discharging, we use it for charging. The model can be treated as a rough approximation of the diffusion model, on which pulse charging is based.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method system for charging a battery, comprising:
   charging the battery at a constant: current during a first time interval; and
   charging the battery at a varying current during a second time interval, wherein the charging uses a kinetic model, wherein the kinetic model models the battery as having an indiffused well and a diffused well, and wherein a charging current to the indiffused well is regulated to exactly compensate for a current flow from the indiffused well to the diffused well.

2. The method of claim 1, wherein the battery is a lithium-ion battery.

3. The method of claim 1, wherein the indiffused well having a capacity c, and a diffused well having a capacity 1−c, and the indiffused well is filled directly by the constant current, and the diffused well is filled only from the indiffused well, via a valve with constant inductance k.

4. The method of claim 3, wherein a flow rate from the indiffused well to the diffused well depends on a height difference between the indiffused well and the diffused well.

5. The method of claim 3, wherein changes of charges for the indiffused well and the diffused well respectively are $$\frac{dy_1}{dt} = i(t) - k(h_1 - h_2)$$

$$\frac{dy_2}{dt} = k(h_1 - h_2).$$

where i is current, is time, and $h_1$ and h2 are heights of the indiffused well and the diffused well, respectively.

6. The method of claim 1, wherein a capacity of the battery is C, and a maximum charging current is I, a time to charge is T=C/I.

7. The method of claim 3, wherein the constant current is a maximum during the first time interval, and the varying current charging compensates for a flow rate from the indiffused well to the diffused well.

8. The method of claim 5, wherein a total charging time is $$\Gamma = \int 0^{(1-\epsilon')C} dh_2^{-1}(l)$$

where $\epsilon'$ is a percentage of uncharged capacities of the diffusion well, are C a capacity of the battery, and l is a time index.

9. The method of claim 5, further comprising:
minimizing a total charging time by maximizing a ratio $h_1/h_2$.

10. The method of claim 9, wherein the minimizing further comprises:
maximizing the current before the indiffused well is full; and
maximizing a capacity of the battery after the indiffused well is full.

11. The method of claim 1, wherein the constant current is turned ON at a lower threshold, and OFF at a higher threshold.

12. The method of claim 11, wherein the claim of the lower and upper thresholds is dynamic and in real time.

13. An apparatus for charging a battery, comprising:
a current source for the battery, wherein the battery is charged by the current source at a constant current during a first time interval, and at a varying current during a second time interval, wherein the charging of the battery uses a kinetic model, wherein the kinetic model models the battery having an indiffused well having a capacity c, and a diffused well having a capacity 1−c, and the indiffused well is filled directly by the current and the diffused well is filled only from the undiffused well via a valve with constant inductance k, and wherein a charging current to the indiffused well is regulated to exactly compensate for a current flow from the indiffused well to the diffused well.

* * * * *